H. A. CORLISS.
NUT LOCK.
APPLICATION FILED APR. 29, 1910.
983,540.
Patented Feb. 7, 1911.
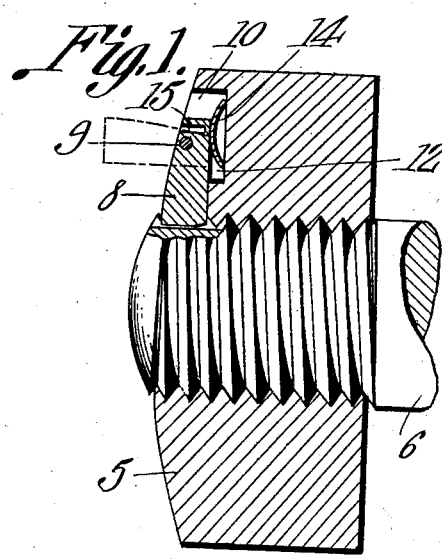
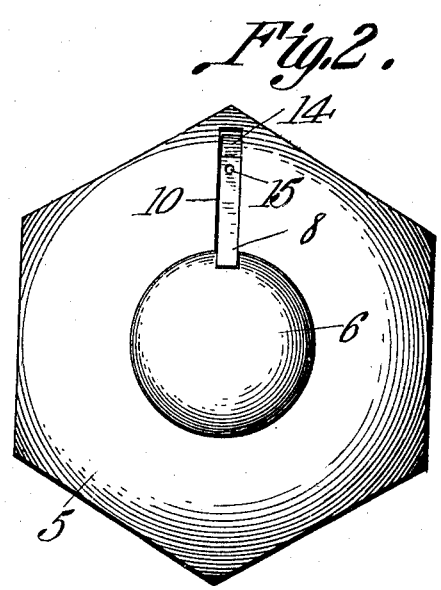
Witnesses
Herbert A. Corliss,
Inventor
by C. A. Snow & Co.
Attorneys

UNITED STATES PATENT OFFICE.

HERBERT A. CORLISS, OF GRANTS PASS, OREGON.

NUT-LOCK.

983,540.

Specification of Letters Patent.     Patented Feb. 7, 1911.

Application filed April 29, 1910. Serial No. 558,381.

*To all whom it may concern:*

Be it known that I, HERBERT A. CORLISS, a citizen of the United States, residing at Grants Pass, in the county of Josephine and State of Oregon, have invented a new and useful Nut-Lock, of which the following is a specification.

It is the object of the present invention to provide an improved nut lock and the invention relates more particularly to a lock nut that is designed to be employed in connection with a bolt formed with a longitudinally extending groove.

Among other things, the invention aims to so construct the lock nut that the same may be readily locked in place upon the bolt or be released, the employment of tools and the destruction or mutilation of the nut or the bolt being obviated.

With the above and other objects in view, the invention consists in the construction and arrangement of parts shown in the accompanying drawings, in which,—

Figure 1 is a vertical longitudinal sectional view through the device. Fig. 2 is a front elevation of the nut.

Referring more specifically to the drawings, there is shown a nut which is indicated by the numeral 5 and this nut is threaded upon a bolt which is indicated by the numeral 6 and is formed with a longitudinally extending groove 7. Aside from the fact that the bolt shank is formed with the groove 7, the said bolt is of the ordinary construction and the nut carries a pawl designed to seat in the said groove and hold the nut against backward rotation after it has been properly adjusted upon the bolt. The pawl above mentioned includes a body which is indicated by the numeral 8 and which is pivoted, as at 9, in a relatively narrow recess 10 formed in the forward face of the nut 5. The body 8 of this pawl is oblong and its pivot is located adjacent one end and inasmuch as the recess 10 in the nut extends radially from the bolt opening therein, the said pawl body may be swung down to the position shown in Fig. 1 of the drawings to bring its free end into engagement with the groove 7, after the nut has been properly threaded onto the bolt.

It is expedient that means be provided for holding the pawl 8 in position with its free end engaging in the groove 7 when it is so moved upon its pivot, and this means is embodied in a bowed leaf spring which is indicated by the numeral 14 and is disposed loosely within the recess with its convex side presented outwardly.

When the pawl 8 is in the position illustrated in Fig. 1 of the drawings, the spring bears against the rear edge of the pawl body or in other words against that edge which is presented toward the bottom of the recess 10 and when the pawl is swung forwardly out of engagement with the groove in the bolt, its upper rear corner will ride over and depress the spring until the pawl assumes substantially the dot and dash line position in Fig. 1 of the drawings, at which time what was formerly its upper end edge, will be engaged by the spring and the pawl will be held in this position by reason of such engagement in the same manner as it is held in the full line or locking position.

It will be readily understood from the foregoing description of the invention that with the pawl in the dot and dash line position shown in Fig. 1 of the drawings, the nut is to be threaded upon the bolt until it has been properly tightened and the inner end of the recess 10 is in registration with the groove 7 or nearly in registration therewith whereupon the pawl is swung to full line position, shown in Fig. 1 of the drawings with its free end seated in the groove 7, this engagement of the pawl in the groove serving to prevent rotation of the nut upon the bolt, as will be readily understood.

The pawl is formed at its pivoted end and at its forward edge with a small socket 15 into which may be inserted the end of a nail or a piece of wire either of which elements may then be employed as a lever for swinging the pawl upon its pivot.

What is claimed is:

A lock nut formed with a radial recess opening at its inner end into the bolt opening of the nut, the recess being deepened throughout a portion of its length, a pawl pivoted in the recess and projecting at its free end into the bolt opening of the nut and movable to lie within said recess or to project forwardly from the nut, and a bowed leaf spring loosely disposed in the deepened portion of the recess and having its convex side presented forwardly and bearing against the pawl at its pivoted end, the said pawl being formed at its pivoted end with a socket to receive an implement for swinging the pawl upon its pivot.

In testimony that I claim the foregoing as my own, I have hereto affixed my signature in the presence of two witnesses.

HERBERT A. CORLISS.

Witnesses:
H. C. SAMPSON,
MARCUS W. ROBBINS.